United States Patent
Halme et al.

(10) Patent No.: US 8,140,527 B2
(45) Date of Patent: Mar. 20, 2012

(54) RETRIEVING PERSONAL USER INFORMATION FOR STORAGE IN A DEVICE

(75) Inventors: Jaakko Halme, Helsinki (FI); Margareta Bjorksten, Helsinki (FI)

(73) Assignee: Nokia Corporation, Espoo (FI)

( * ) Notice: Subject to any disclaimer, the term of this patent is extended or adjusted under 35 U.S.C. 154(b) by 359 days.

(21) Appl. No.: 11/794,489

(22) PCT Filed: Mar. 1, 2005

(86) PCT No.: PCT/IB2005/000520
§ 371 (c)(1),
(2), (4) Date: Oct. 9, 2007

(87) PCT Pub. No.: WO2006/092643
PCT Pub. Date: Sep. 8, 2006

(65) Prior Publication Data
US 2008/0046398 A1    Feb. 21, 2008

(51) Int. Cl.
*G06F 17/30*    (2006.01)
(52) U.S. Cl. ........ 707/732; 707/600; 707/705; 707/736; 707/758; 707/769; 707/770
(58) Field of Classification Search .................. 707/600, 707/700, 705, 732, 736, 758, 769, 770
See application file for complete search history.

(56) References Cited

U.S. PATENT DOCUMENTS

| 2002/0057678 | A1 | 5/2002 | Jiang et al. | 370/353 |
| 2003/0172090 | A1 | 9/2003 | Asunmaa et al. | 707/200 |
| 2004/0111374 | A1* | 6/2004 | Goldstein et al. | 705/64 |
| 2004/0128546 | A1* | 7/2004 | Blakley et al. | 713/201 |
| 2004/0249839 | A1* | 12/2004 | Beenau et al. | 707/100 |

FOREIGN PATENT DOCUMENTS
EP    1 017 030 A2    7/2000

OTHER PUBLICATIONS
Nokia Press Release, "Nokia to introduce a mobile wallet application with the Nokia 6310", Mar. 2005, 2 pgs.
Ebringer, T., et al., "Parasitic Authentication to Protect Your E-Wallet", © 2000 IEEE, 8 pgs.
Pierce, J.A., et al., "RF Wallet with Fraud Protection", © Motorola, Inc, Jun. 1999, 2 pgs.

* cited by examiner

*Primary Examiner* — Frantz Coby
(74) *Attorney, Agent, or Firm* — Harrington & Smith

(57) ABSTRACT

This invention relates to a method for retrieving personal user information from a user of a device, wherein personal user information retrieved from said user is stored in the device, the method including automatically deciding if retrieving of the personal user information is required; and taking action to retrieve the personal user information if it has been decided that the retrieving is required. The invention further relates to a computer program, a computer program product, a device and a module for retrieving personal user information from a user of a device.

22 Claims, 1 Drawing Sheet

RETRIEVING PERSONAL USER INFORMATION FOR STORAGE IN A DEVICE

FIELD OF THE INVENTION

This invention relates to a method for retrieving personal user information from a user of a device, wherein personal user information provided in response to said retrieving is stored in said device. The invention further relates to a computer program, a computer program product, a device and a module for retrieving personal user information.

BACKGROUND OF THE INVENTION

Today an increasing number of services provided by mobile communications systems requires knowledge on personal user information. For instance, in the context of mobile shopping, where a user can purchase goods via his mobile phone, personal user information such as the user's name, credit and loyalty card details as well as shipping and billing details is required to accomplish the electronic cash transactions.

However, entering personal user information into a mobile phone is a cumbersome and error-prone task, because generally, only a reduced-size keyboard is available as user interface.

In the context of using personal user information for mobile shopping, this problem is at least partially overcome by the use of the so-called wallet solution, which allows personal user information such as credit card details to be stored in a dedicated storage location of the mobile phone, the so-called wallet. Personal user information stored in the wallet can then be made available to other applications operated by said mobile phone (e.g. applications integrated into the HTML browser of the mobile phone). Via a wallet application, the user can manage his personal user information, i.e. enter and change his/her personal user information. The personal user information stored in the wallet is secured with a special wallet code to authenticate the user to the application. The wallet solution thus eliminates the necessity to re-enter the personal user information each time when a mobile service requires personal user information.

The seamless use of the wallet requires that the user at least once enters his personal user information by starting the wallet application. However, due to the user's unawareness of the wallet application, or due to the fact that the user does not know how to start the wallet application, or due to the intricateness of entering the personal user information via the reduced-size keyboard of the mobile phone, users generally do not start the wallet application by themselves to provide their personal user information. As a consequence, the wallet can not or not properly be used with mobile services that require personal user information.

SUMMARY OF THE INVENTION

In view of the above-mentioned problem, it is, inter alia, an object of the present invention to provide a method, computer program, computer program product, device and module for retrieving personal user information from a user of a device.

It is proposed a method for retrieving personal user information from a user of a device, wherein personal user information retrieved from said user is stored in said device, said method comprising automatically deciding if retrieving of said personal user information is required; and taking action to retrieve said personal user information if it has been decided that said retrieving is required.

Said device may for instance be a mobile phone, a personal digital assistant, a computer, or any other type of electronic device. Said personal user information may represent any type of information related to said user, as for instance his/her name, address, credit card details, log-in information for specific services, or any other type of user-related information. Said personal user information may for instance be required by a service that is provided by a system in the context of which said device is operated.

Personal user information is retrieved from said user, for instance by a dialog application presented to said user via a graphical user interface of said device. In said retrieving, said user may then provide personal user information to said device, for instance via a keyboard of said device. Therein, said personal user information retrieved form said user may only be a portion of a pre-defined set of information, or all of said pre-defined set of information.

Personal user information provided by said user is stored in said device, for instance in a dedicated memory location. Said personal user information may be persistently stored, so that it is not erased or lost when said device is turned off or separated from a power source. Said persistently stored personal user information may nevertheless be erased by a hard reset of said device. Said retrieving of said personal user information may for instance be performed by starting a wallet application, and said personal user information then may be stored in a wallet of said device.

According to the present invention, it is automatically decided, for instance by a process operated by said device without user interaction, if retrieving of said personal user information is required. This decision may for instance be based on a set of rules or events, which are checked to decide if said retrieving is required. For instance, said retrieving may be decided to be required it no personal user information has been stored in said device so far, or if stored personal user information is considered to be incomplete, or if it is assumed that stored personal user information is no longer up to date because said device is now used by a new user, or in other suitable cases. Said checking may for instance be implemented into the operational system of said device, and may be executed during or after the turning-on of said device. In particular, said checking may be performed independent of an actual need of an application or service for said personal user information. If it is decided that said retrieving is required, action is taken to retrieve said personal user information, for instance by first determining if said user is willing to provide said personal user information, and, in case said user is willing to provide said personal user information, then starting a dialog application for actually retrieving said personal user information; or by directly starting a dialog application for retrieving said personal user information from said user.

Thus according to the present invention, and in contrast to prior art, it is automatically ensured that personal user information is made available to and stored in said device, so that, once stored, said personal user information can be frequently used by applications operated by said device in the context of various types of services. This is for instance advantageous in case a user is unaware that there exists a possibility to store his/her personal user information, or in case that already stored personal user information is incomplete or out-dated and thus has to be amended.

According to an embodiment of the method of the present invention, said personal user information stored in said device is used by applications operated by said device. Said applications may for instance allow said user to access all types of services, for instance services that involve online payment. Equally well, said applications may be related to a connection of said device to specific networks. Said applications may particularly transfer said personal user information outside said device, wherein said transfer may for instance be a secure transfer, and wherein said transfer has to be permitted by said user.

According to an embodiment of the method of the present invention, said personal user information authenticates said user. Said authentication may for instance be based on a user name and a password, or on credit card details, or similar identification parameters. Said user may for instance be authenticated towards a service, such as for instance a mobile service like mobile shopping, or download of any type of information or multimedia that are liable for charges.

According to an embodiment of the method of the present invention, said personal user information authenticates said user in an electronic cash transaction. Said electronic cash transaction may for instance be comprised in a mobile shopping service, wherein goods are purchased or sold by said user via said device.

According to an embodiment of the method of the present invention, said personal user information authenticates said user towards a network. Said network may for instance be a Wireless Local Area (WLAN) system, a mobile communications system or the like.

According to an embodiment of the method of the present invention, it is decided that said retrieving of said personal user information is required if no personal user information is stored in said device at all. To this end, it may for instance be checked during or after a turning-on of said device, if personal user information is already stored in said device. This embodiment of the present invention may thus for instance cover the case that the device is turned on for the first time (e.g. during commissioning by said user), and the case that a hard reset has been performed with said device. Whereas in the former case, no personal user information has ever been stored in said device, in the latter case, personal user information eventually stored in said device before said hard reset has been deleted.

According to an embodiment of the method of the present invention, it is decided that said retrieving of said personal user information is required if personal user information already stored in said device is incomplete. This embodiment may for instance cover the case that a previous attempt to store personal user information in said device has failed or was finished before completion, or the case that personal user information that is considered complete for a first-type application is not sufficient for a second-type, e.g. more advanced or up-dated application.

According to an embodiment of the method of the present invention, said personal user information already stored in said device is incomplete if it does not contain all information that is required for using it with an application that is operated by said device. A decision if said personal user information is complete may for instance be taken when a new application is stored in said device, or when an application is started.

According to an embodiment of the method of the present invention, it is decided that said retrieving of said personal user information is required if personal user information already stored in said device is no longer up to date. This may for instance be the case if personal user information of a first user is stored in said device although the device is used by a second user.

According to an embodiment of the method of the present invention, it is decided that said retrieving of said personal user information is required if an exchange of an identification unit that is in interaction with said device and identifies a user of said device occurs. Said identification unit may for instance be a Subscriber Identity Module (SIM) of a mobile phone, or a similar identification module.

According to an embodiment of the method of the present invention, said taking action to retrieve said personal user information comprises determining if said user of said device is willing to provide said personal user information to said device; and starting a dialog application for retrieving said personal user information from said user of said device if it has been determined that said user of said device is willing to provide said personal user information to said device. Said determining if said user of said device is willing to provide said personal user information may for instance be accomplished by asking said user if he/she is willing to provide said personal user information, for instance via a graphical user interface of said device. Said dialog application for retrieving said personal user information from said user may for instance be a wallet application.

According to an embodiment of the method of the present invention, said taking action to retrieve said personal user information comprises starting a dialog application for retrieving said personal user information from said user of said device. Said dialog application thus is started directly without determining if said user is willing to provide said personal user information. Said dialog application may then for instance provide a possibility to terminate said dialog application without having to provide said personal user information to said device.

According to an embodiment of the method of the present invention, said device is a portable electronic device. Said device may for instance be a mobile phone, a personal digital assistant, a computer, or any other type of electronic device.

It is further proposed a computer program for retrieving personal user information from a user of a device, wherein personal user information retrieved from said user is stored in said device, said computer program comprising instructions operable to cause a processor to automatically decide if retrieving of said personal user information is required, and to take action to retrieve said personal user information if it has been decided that said retrieving is required. Said computer program may for instance be executed by a central processing unit of said device.

According to an embodiment of the computer program of the present invention, it is decided that said retrieving of said personal user information is required if personal user information already stored in said device is incomplete.

It is further proposed a computer program product comprising a computer program for retrieving personal user information from a user of a device, wherein personal user information retrieved from said user is stored in said device, said computer program comprising instructions operable to cause a processor to automatically decide if retrieving of said personal user information is required, and to take action to retrieve said personal user information if it has been decided that said retrieving is required. Said computer program product may for instance be any means for electrically, magnetically and/or optically storing said computer program product, such as for instance a random access memory, a hard disc or a CD.

According to an embodiment of the computer program product of the present invention, it is decided that said retrieving of said personal user information is required if personal user information already stored in said device is incomplete.

It is further proposed a device for retrieving personal user information from a user of said device, wherein personal user information retrieved from said user is stored in said device, said device comprising means arranged for automatically deciding if retrieving of said personal user information is required; and means arranged for taking action to retrieve said personal user information in dependence on said decision if said retrieving is required.

According to an embodiment of the device of the present invention, it is decided that said retrieving of said personal user information is required if personal user information already stored in said device is incomplete. It is further proposed a module for retrieving personal user information from a user of a device, wherein personal user information retrieved from said user is stored in said module, said module comprising means arranged for automatically deciding if retrieving of said personal user information is required; and means arranged for taking action to retrieve said personal user information in dependence on said decision if said retrieving is required. Said module may for instance be integrated into or attached to said device.

According to an embodiment of the module of the present invention, it is decided that said retrieving of said personal user information is required if personal user information already stored in said module is incomplete.

These and other aspects of the invention will be apparent from and elucidated with reference to the embodiments described hereinafter.

BRIEF DESCRIPTION OF THE FIGURES

In the figures show.

DETAILED DESCRIPTION OF THE INVENTION

In the following detailed description, the present invention will be described by means of exemplary embodiments, which are by no means intended to limit the scope of applicability of the present invention.

Figure 1:
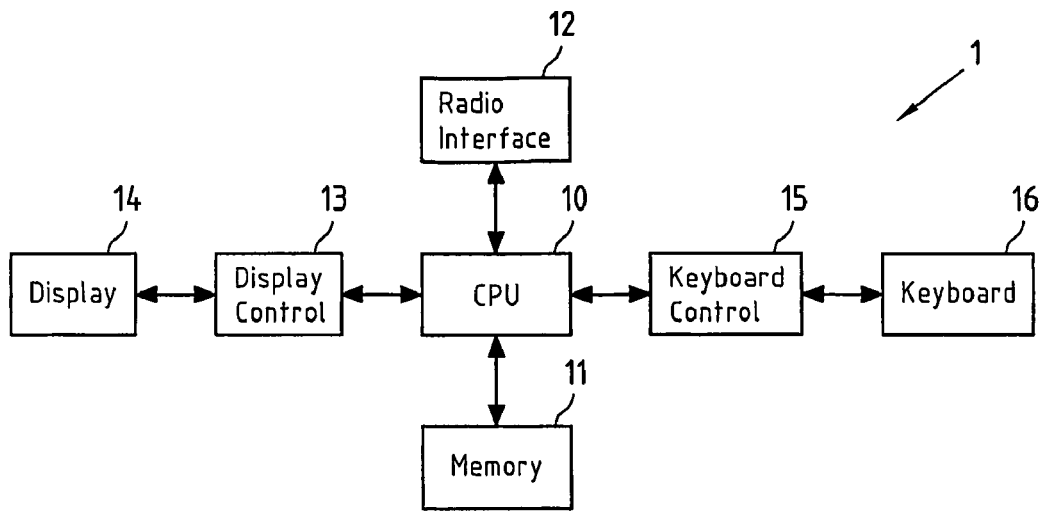
FIG. 1: An exemplary embodiment of a device according to the present invention.

FIG. 1 depicts an exemplary embodiment of a device 1 according to the present invention. The device 1 represents a mobile phone that serves as an interface between a user and a mobile communications system, as for instance the Universal Mobile Telecommunications System (UMTS), and/or between a user of a Wireless LAN (WLAN) system, as for instance a WLAN according to the IEEE 802.11 standard.

The device 1 comprises a central processing unit 10, which controls the operation of the entire device 1, a memory 11, a radio interface 12 that conducts all tasks related to the transfer of information between the device 1 and a base station of a mobile communications system by means of electromagnetic waves, a display 14, which is controlled by CPU 10 via a display controller 13, and finally a keyboard 16, which is controlled by CPU 10 via a keyboard controller 15. Therein, said display 14 may equally well be a touch-screen display, and then said keyboard 16 may at least partially be implemented by means of this touch-screen display as well. The components of device 1 are particularly capable of retrieving personal user information according to the present invention. It should be noted that the present invention can equally well be implemented by a module that is integrated into or attached to a device like device 1 in FIG. 1. This module then may for instance interact with CPU 10 of device 1 to retrieve personal user information from a user of device 1, or may at least partially comprise components as the components 10-16 of device 1 itself.

Personal user information may for instance represent credit card details (such as card holder name, card number and expiry date) of the user of device 1. These credit card details may be used by applications that are operated by CPU 10 of device 1 in order to perform mobile cash transactions. For instance, the user of device 1 may start a Wireless Application Protocol (WAP) browser or a Hypertext Transfer Protocol (HTTP) browser on device 1, and may use the browser to navigate to a vendor's Internet page where goods can be purchased. In the payment process, the user's credit card details will be requested by the vendor's page. In order to avoid that the user has to enter his credit card details via the keyboard 16 of device 1 each time he performs a mobile cash transaction, device 1 offers the possibility to store these credit card details in a dedicated portion of memory 11, which can be considered as an electronic wallet. The credit card details can be provided to the device 1 by starting a wallet application, which is controlled by the CPU and stores the information that is provided by the user via keyboard 16. Once the credit card details are stored, the wallet can be used for mobile cash transactions without requiring the user to enter credit card details anew. Transfer of the credit card details from the wallet then may for instance be authorized by the user by entering a wallet code.

Another example of personal user information is a set of log-in information that is required when device 1 shall be connected to a Wireless Local Area Network (WLAN). Said device 1 then may for instance be a mobile phone or a laptop computer that are capable of interacting with a WLAN system. As such WLAN systems, which are for instance provided in hotspot areas as airport terminals or the like, are liable for charges, usually registration is required for billing purposes. This registration may for instance be based on log-in details of the user of device 1, as for instance user name and password, and may be stored by device 1 as personal user information. This personal user information may then also contain a set of connection parameters that characterise the performance and capabilities of device 1.

A further example of personal user information relates to the Over The Air (OTA) standard. OTA is a standard for the transmission and reception of application-related information in a wireless communications system. OTA is commonly used in conjunction with the Short Messaging Service (SMS), which allows the transfer of small text files even while using a mobile phone for more conventional purposes. In addition to short messages and small graphics, such files can contain instructions for subscription activation, banking transactions, ringtones, and Wireless Access Protocol (WAP) settings. OTA messages can be encrypted to ensure user privacy and data security. Personal user information may then for instance represent parameters required by device 1 to activate an OTA session.

The use of personal user information for mobile services relating to mobile cash transactions, WLAN participation, OTA and similar services requires the proper provision of the user's personal user information to the device 1. However, due to a plurality of reasons, users frequently do not provide their personal user information at all. The user may for instance be not aware of the device's capability to use stored personal user information in mobile services, or may not know how to start an application for providing his/her personal user information. Even if personal user information is provided for storage in the device by a user, the provided information may be incomplete or outdated.

To allow for a successful deployment of stored personal user information in mobile services (as for instance mobile cash transactions), the present invention ensures that personal user information (as for instance credit card details) is provided for storage to the device by a user.

Figure 2:
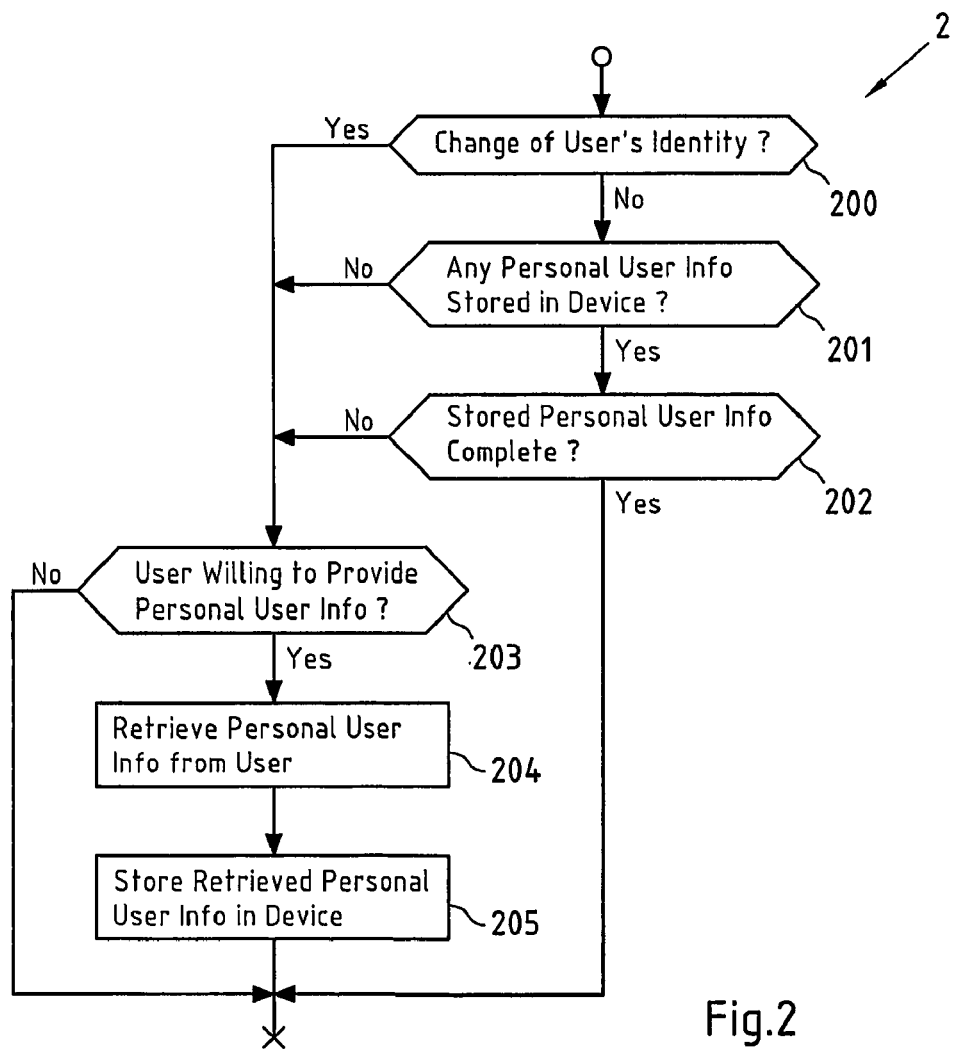
FIG. 2: a flowchart of an exemplary embodiment of a method according to the present invention.

FIG. 2 depicts a flowchart 2 of an exemplary embodiment of a method according to the present invention that ensures the provision of the personal user information by the user. The steps of this flowchart 2 may for instance be executed by the components of device 1 (see FIG. 1). The steps of the flowchart 2 may for instance be implemented as a part of the operational system of device 1, and may be executed during or after a start-up phase (during or after turning-on) of device 1. The steps of flowchart 2 thus may in particular be executed independently of a current request of an application or service for the personal user information.

In a first step 200 of this flowchart 2, it is checked, if the identity of the user of device 1 has changed. Such a change may imply that, regardless whether personal user information has been provided for storage in memory 11 of device 1 before the change or not, a new provision of personal user information by the new user is required. This check of step 200 may for instance be performed by CPU 10 of device 1 (see FIG. 1), for instance by checking if an identification module that is in contact with device 1 and identifies a user of device 1, as for instance a Subscriber Identity Module (SIM) in case of the device 1 representing a mobile phone, has been exchanged.

If the check in step 200 reveals that a change of the identity of the user of device 1 has occurred, the flowchart 2 proceeds to step 203 and determines if the user is willing to provide personal user information. This determination may for instance be accomplished by asking the user via a message displayed on the display 14 of device 1 (see FIG. 1) if he is ready to provide personal user information. The user may then respond to this question via the keyboard 16 and either agree or disagree with the provision of his/her personal user information to the device 1. In the latter case, the method according to the present invention terminates, whereas in the former case, the flowchart 2 proceeds to step 204 and retrieves personal user info from the user of device 1. This may for instance be accomplished by starting a dialog application for retrieving the personal user information from the user. The dialog application may for instance be a wallet application operated by the CPU 10 of device 1 (see FIG. 1), which controls the display 14 and the keyboard 16 to allow for the provision of the personal user information by the user. In this dialog application, the components of the personal user information that are to be entered by the user may be sequentially displayed on the display as requests, wherein after each displaying of a component, the user is expected to enter the respectively requested information. If said personal user information represents credit card details, for instance, first the component "name" may be displayed, and then the user may enter his name. This may then be repeated for further components, as for instance "credit card number" and "credit card expiry date".

After the dialog application has finished, in a step 205, the retrieved personal user information is stored in the memory 11 of device 1 (see FIG. 1), and can afterwards be used by the device 1 in mobile services, for instance as a wallet in mobile cash transactions. It is readily understood that the steps 204 and 205 can equally well be performed in cascaded fashion, i.e. that each component of the personal user information retrieved from the user is stored before the retrieving of the next component. After the storage of the last retrieved component, the method terminates.

Returning to the check of step 200 of the flowchart 2, if it is determined that no change of the user's identity has occurred, it is checked in a step 201 if any personal user information has been stored in the memory 11 of the device 1 so far. If this is not the case, action is taken to retrieve personal user information from the user in steps 203-204, as already described above. If it is determined in step 201 that personal user information has already been provided, it is checked in step 202 if this stored personal user information is complete. Incomplete stored user information may for instance stem from an aborted retrieving of personal user information. Equally well, said already stored personal user information may be incomplete because an application that uses said personal user information was upgraded and now requires more personal user information, or because already stored personal user information, for instance credit card details, is applicable only to a first application, whereas a second application requires different personal user information, as for instance log-in details for a WLAN or a similar network. If it turns out in step 202 that already stored user information is complete, the method terminates. Otherwise, action is taken to retrieve missing personal user information in steps 203-204 as described above. Therein, the retrieving of the personal user information may be limited to the incomplete portion of the personal user information.

The invention has been described above by means of exemplary embodiments. It should be noted that there are alternative ways and variations which are obvious to a skilled person in the art and can be implemented without deviating from the scope and spirit of the appended claims. In particular, the present invention is not limited to application in mobile phones of a mobile communications system only, it can equally well be deployed in computers or similar electronic devices.

The invention claimed is:

1. A method comprising:
   detecting a power-on of an apparatus that includes a display, the apparatus comprising at least one of a mobile phone, a personal digital assistant and a computer;
   determining if a retrieval of personal user information from the apparatus is required by determining if an identity of a user of the apparatus has changed since a last power-on of the apparatus or if an application operated by the apparatus requires additional personal user information than is currently available on the apparatus, wherein said personal user information is required if no personal user information is stored in said apparatus at all or if personal user information already stored in said apparatus is incomplete or if personal user information already stored in said apparatus is no longer up to date; and
   taking action to retrieve said personal user information if it has been decided that said retrieving is required, said method being for retrieving personal user information from said user of said apparatus, wherein personal user information retrieved from said user is stored in said apparatus.

2. The method according to claim 1, wherein said personal user information stored in said apparatus is used by applications operated by said apparatus.

3. The method according to claim 1, wherein said personal user information authenticates said user.

4. The method according to claim 1, wherein said personal user information authenticates said user in an electronic cash transaction.

5. The method according to claim 1, wherein said personal user information authenticates said user towards a network.

6. The method according to claim 1, wherein said personal user information already stored in said apparatus is incomplete if it does not contain all information that is required for using it with an application that is operated by said apparatus.

7. The method according to claim 1, wherein it is decided that said retrieving of said personal user information is required if an exchange of an identification unit that is in interaction with said apparatus and identifies a user of said apparatus occurs.

8. The method according to claim 1, wherein said taking action to retrieve said personal user information comprises:
   determining if said user of said apparatus is willing to provide said personal user information to said apparatus; and
   starting a dialog application for retrieving said personal user information from said user of said apparatus if it has been determined that said user of said apparatus is willing to provide said personal user information to said apparatus.

9. The method according to claim 1, wherein said taking action to retrieve said personal user information comprises:
   starting a dialog application for retrieving said personal user information from said user of said apparatus.

10. The method according to claim 1, wherein said apparatus is a portable electronic device.

11. The method of claim 1, wherein determining if an identity of the user has changed comprises detecting a new or updated SIM card in the apparatus.

12. The method of claim 1, wherein determining if an application on the apparatus requires more personal user information comprises:
   detecting each application running on the apparatus;
   determining categories of personal user information required by each application;
   comparing the categories of required personal user information to personal information stored on the apparatus; and
   retrieving additional personal user information corresponding to a required category that is not currently stored.

13. A computer readable medium comprising a computer program configured to retrieve personal user information from a user of an apparatus, which includes a display, comprising at least one of a mobile phone, a personal digital assistant and a computer, wherein personal user information retrieved from said user is stored in said apparatus, said computer program comprising instructions configured to cause a processor to:
   automatically decide upon turning-on of said apparatus if retrieving of said personal user information is required by determining if an identify of the user has changed since a last turning-on of the apparatus or if an application operated by the apparatus requires additional personal user information that is currently available on the apparatus, wherein said personal user information is required if no personal user information is stored in said apparatus at all or if personal user information already stored in said apparatus is incomplete or if personal user information already stored in said apparatus is no longer up to date; and
   take action to retrieve said personal user information if it has been decided that said retrieving is required.

14. An apparatus comprising:
   at least one processor;
   at least one memory including computer program code;
   the at least one memory and the computer code configured to, with the at least one processor, cause the apparatus, which includes a display and comprises at least one of a mobile phone, a personal digital assistant and a computer, at least to perform:
   automatically deciding upon turning-on of said apparatus if retrieving of personal user information is required by determining if an identity of a user of the apparatus has changed since a last turning-on of the apparatus or if an application operated by the apparatus requires additional personal user information than is currently available on the apparatus wherein said personal user information is required if no personal user information is stored in said apparatus at all or if personal user information already stored in said apparatus is incomplete or if personal user information already stored in said apparatus is no longer up to date; and
   taking action to retrieve said personal user information if it has been decided that said retrieving is required, wherein said personal user information retrieved from said user is stored in said apparatus.

15. The apparatus according to claim 14, wherein said personal user information stored in said apparatus is used by applications operated by said apparatus.

16. The apparatus according to claim 14, wherein said personal user information authenticates said user.

17. The apparatus according to claim 14, wherein said personal user information authenticates said user in an electronic cash transaction.

18. The apparatus according to claim 14, wherein said personal user information authenticates said user towards a network.

19. The apparatus according to claim 14, wherein said personal user information already stored in said apparatus is incomplete if it does not contain all information that is required for using it with an application that is operated by said apparatus.

20. The apparatus according to claim 14, wherein it is decided that said retrieving of said personal user information is required if an exchange of an identification unit that is in interaction with said apparatus and identifies a user of said apparatus occurs.

21. The apparatus according to claim 14, wherein said processor is configured to: during taking action to retrieve said personal user information to:
   determine if said user of said apparatus is willing to provide said personal user information to said apparatus; and
   start a dialog application for retrieving said personal user information from said user of said apparatus if it has been determined that said user of said apparatus is willing to provide said personal user information to said apparatus.

22. The apparatus according to claim 14, wherein the processor is configured to retrieve said personal user information to start a dialog application for retrieving said personal user information from said user of said apparatus.

* * * * *